United States Patent [19]

Lang

[11] 3,721,759
[45] March 20, 1973

[54] METHOD OF AND DEVICE FOR THE AUTOMATIC FOCUSING OF MICROSCOPES

[75] Inventor: Walter Lang, Aalen, Germany
[73] Assignee: Carl Zeiss-Stiftung, Wuerttemberg, Germany
[22] Filed: Feb. 11, 1971
[21] Appl. No.: 114,596

[30] Foreign Application Priority Data

Feb. 24, 1970 Germany..................P 20 08 390.3

[52] U.S. Cl..........178/7.2, 178/DIG. 29, 178/DIG. 1
[51] Int. Cl..............................................H04n 7/18
[58] Field of Search....178/DIG. 29, 7.2, 6.8, DIG. 1; 350/46

[56] References Cited

UNITED STATES PATENTS

| | | | |
|---|---|---|---|
| 3,509,275 | 4/1970 | Deeley et al.......................... | 178/7.2 |
| 3,450,833 | 6/1969 | Hobrough....................... | 178/DIG. 29 |
| 3,356,792 | 12/1967 | Defas............................. | 178/DIG. 29 |
| 3,358,334 | 11/1970 | Shaffer........................... | 178/DIG. 29 |

*Primary Examiner*—Richard Murray
*Attorney*—Sandoe Hopgood and Calimafde

[57] ABSTRACT

The invention contemplates a method and means whereby critical focus can be automatically achieved in a microscope, using TV scanning of the imaged object while the focused condition of the microscope is varied. As its criterion for critical focus, the invention in a preferred form uses a minimum-length or a minimum-area evaluation, while the fine-focus mechanism of the microscope is being driven, continuously and at constant speed. As soon as the television system indicates that the minimum of the measuring signal has been reached, the fine-focus drive is terminated. The microscope is then critically focused.

10 Claims, 9 Drawing Figures

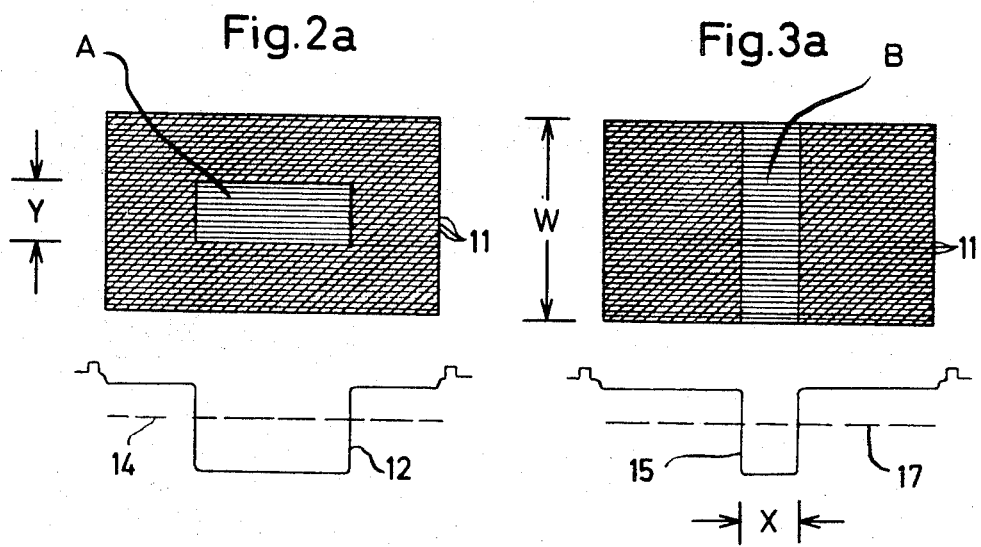
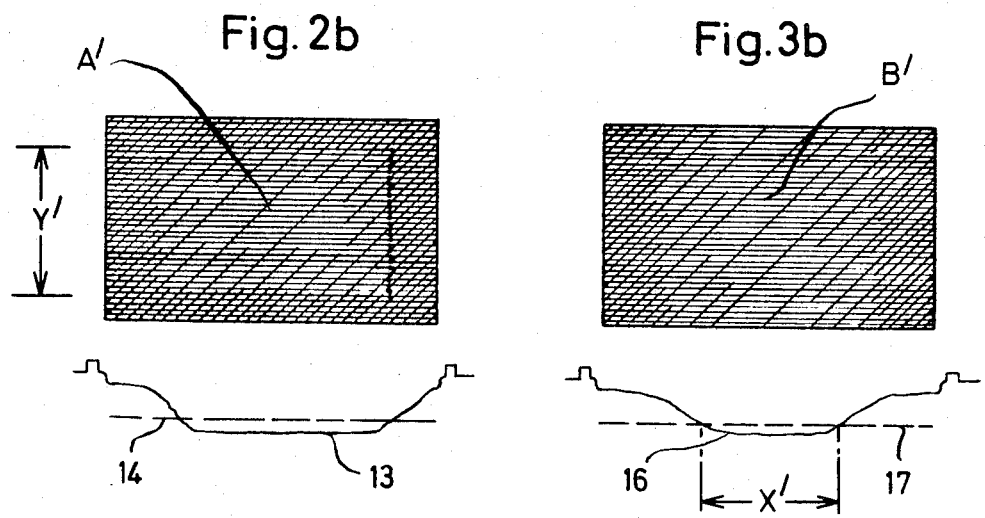

METHOD OF AND DEVICE FOR THE AUTOMATIC FOCUSING OF MICROSCOPES

The focusing of microscopes, that is, the critical focusing of an observed image, is effected by manual actuation of the focusing means by means of a visually accomplished focusing control. Aside from the relatively great time required for such focusing, the overriding fact is that critical focusing of the object is judged subjectively, with the result that, depending upon the operator's experience, methodical errors of judgment become effective. Such errors are particularly objectionable in microscopes used for making measurements on the object, in that errors are involved which do not permit unambiguous comparison of the measured values.

Known microscopes for stereometric examination of transilluminated objects automatically carry out a quantitative image analysis. But in substantially automated apparatus of the character indicated, the described manual focusing operation represents a severe limitation on the attainable analyzing speed.

It is, accordingly, an object of this invention to provide an improved method of and device for focusing microscopes. Specifically, it is an object to accomplish such improvement while avoiding the aforesaid disadvantages, and permitting automatic focusing which is free of focusing errors.

Thus, the invention relates to a method of and device for the automatic focusing of microscopes. According to the invention, a measurement of length or area is carried out on the image of the selected object, using closed-circuit television means; at the same time, the fine focusing of the microscope is adjusted until the measuring signal reaches a minimum value. For the measurement itself, a pre-established reference voltage is adjusted so that only the image elements whose video signals exceed this voltage value, contribute to the measurement of area.

As a criterion for critically focusing the object image on the photocathode of the TV camera tube, the invention utilizes minimum-length or a minimum-area characteristic of the object image, as determined by evaluating means forming part of the television system, the fine-focusing mechanism of the microscope being driven continuously and at constant speed. As soon as the television system indicates that the minimum of the measuring signal has been reached, adjustment of fine focusing is terminated automatically. The microscope is then focused unambiguously, in that focusing is based on an objectively determined criterion and for this reason is reproducible at any time.

In the measurement of length or area, and as will be later explained, there is only a limited interval or adjustment distance in which a useful relation exists between the determined measured value and the adjustment of the fine focusing means. For this reason, fine focusing of the microscope is advantageously limited to this pre-established interval.

A few illustrative embodiments of the method and apparatus of the invention will be described more fully with reference to the accompanying drawings, in which:

FIG. 2a illustrates an object image produced on the photocathode of the TV camera of FIG. 1, for the case of a critically focused length measurement Y, there being reproduced below this illustration a graph representing the scanned video signal for one line of the TV raster, taken through the object;

FIG. 2b is a similar illustration, with accompanying graph of the corresponding video signal, for the case of uncritical focusing of the same imaged object as in FIG. 2a;

FIG. 3a is a similar illustration, with accompanying graph of the corresponding video signal, for the case of measuring the critically focused area of for an object image;

FIG. 3b is a similar illustration, with accompanying graph of the corresponding video signal, for the case of uncritical focusing for the area measurement contemplated by FIG. 3a;

Figure 1:
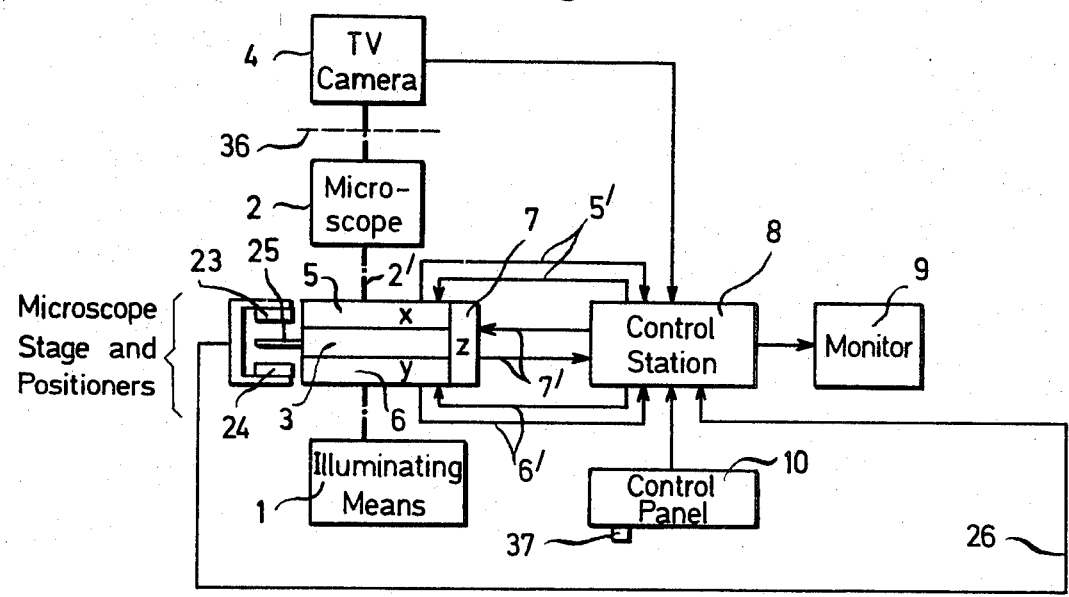
FIG. 1 is a schematic illustration of one embodiment or form of the invention.

In FIG. 1, reference numeral 1 designates the illuminating system of a microscope, schematically referenced 2 and on an optical axis or alignment 2'. The object under examination is mounted on the microscope stage 3. A TV camera 4 is associated with the microscope 2, and camera 4 is electrically connected with a control station 8. A monitor 9 and a control panel 10 are also connected with the control station, to complete the closed-circuit TV system.

The microscope stage 3 includes schematically illustrated coordinate-positioning devices 5-6-7, used to adjust the stage in the $x$-, $y$- and $Z$-directions, with respect to the viewing axis of the microscope. As suggested by control lines 5'-6'-7', these adjusting movements are independently controlled through the control station 8. In the illustrated embodiment, fine focusing of the microscope 2 is effected by movement of the microscope stage 3 in the $z$-direction.

FIG. 2a depicts the image field of the microscope, as produced on the photocathode of the TV camera 4; in said field is a filamentary object of approximately circular cross-section, with its longitudinal axis oriented to be approximately perpendicular to the microscopic axis, and substantially aligned with the line-scanning axis of the TV raster. The condition of optimum focusing is illustrated, in which the object appears as a narrow bright strip A. In this situation, line scans (referenced 11) through the object provide a video signal 12, characterized by a pronounced negative voltage step at margins of the object image.

If the object image is defocused, the object area in the image will increase, and the object margins and object details become increasingly indistinct. The image for such a defocused stage is shown in FIG. 2b, in which the same object is seen to produce a slightly brightened band A' (i.e., less bright than at A in FIG. 2a) without sharp contours, and the corresponding video signal 13 exhibits a more gradual change of voltage over a greater portion of the TV scan line; the latter change of voltage exhibits a relatively low maximum amplitude.

The line 14 illustrated in FIGS. 2a and 2b represents the adjustably selected position of a discriminator threshold of brightness or intensity of the object image. Only video signals with negative voltage values crossing the discriminator threshold 14 are used for the measurement.

In the illustrated case (FIG. 2a), a measurement of object length is carried out by means of a so-called "-points-of-intersection" count. This means a count of the points of intersection of the lines 11 with the object margin at the bright-to-dark transition, suggested in FIG. 2a by a heavy dot at the bright-to-dark transition for each applicable scan line 11. In the case of simple coherent objects, as in the illustrated embodiment, the greatest extent or length Y of the object in the vertical or y-axis direction can directly be measured by this method. As the spacing of the scan lines 11 is equidistant and constant, the number of the points of intersection is directly proportional to the vertical extent Y of the object.

The points-of-intersection count may be performed by known means at the control station 8. And it is readily apparent that, in the case of uncritical focusing according to FIG. 2b, the extent Y' measured by the television system 4-8 is greater than in the case of optimum critical focusing according to FIG. 2a.

Although critical focus may be achieved by the length criterion discussed for FIG. 2a, area-measurement is generally preferred, as this provides an unambiguous measuring criterion which has application for the case of more complex object images. FIG. 3a illustrates the critical-focus condition, using the area-measurement technique.

In FIG. 3a, an image B is displayed for an object which may be filamentary, as already illustrated in FIG. 2a. Herein, however, the object stage 3 is rotated through 90°, so that the object image B is perpendicular to the scan lines 11, and the length of the object at least extends the full effective width of the imaged field; the video signal of an image line produced in the illustrated condition of optimum focusing is referenced 15. FIG. 3b illustrates the image B' produced on the cathode of the TV camera tube (for the same 90°-rotated situation) in the defocused condition of the microscope, and the corresponding video signal of an image-scanning line is referenced 16. Line 17 represents the discriminator threshold for the brightness of the object image, for both the focused and defocused situations of FIGS. 3a and 3b. Only video signals with negative voltage values crossing the threshold 17 are used for he measurement, which, for area measurement, has only to interpret the scanline length X over which the pulse or signal 15 appears beyond threshold 17; for defocused situations, as in FIG. 3b, a greater length X' appears for each line scan of the object image. It will be understood that the area measurement F follows from the known or constant width dimension W, in the context of the measured transverse dimension X (X'), the area being a minimum when the minimum X is achieved at critical focus; electronic circuits for producing a d-c signal output $_F$ which continuously reflects the proportion that X or X' Bears to the full scan-line length are well known and may be part of the area-evaluating option available at control station 8.

It will be understood that the control station 8 which carriers out the preferred area measurement, provides a signal $i_F(Z)$ of amplitude which, in the case of optimum focusing (i.e., for smallest area of the object image), is less than in the case of an uncritical focusing of the image. This situation is graphically depicted in FIG. 4.

Figure 4:
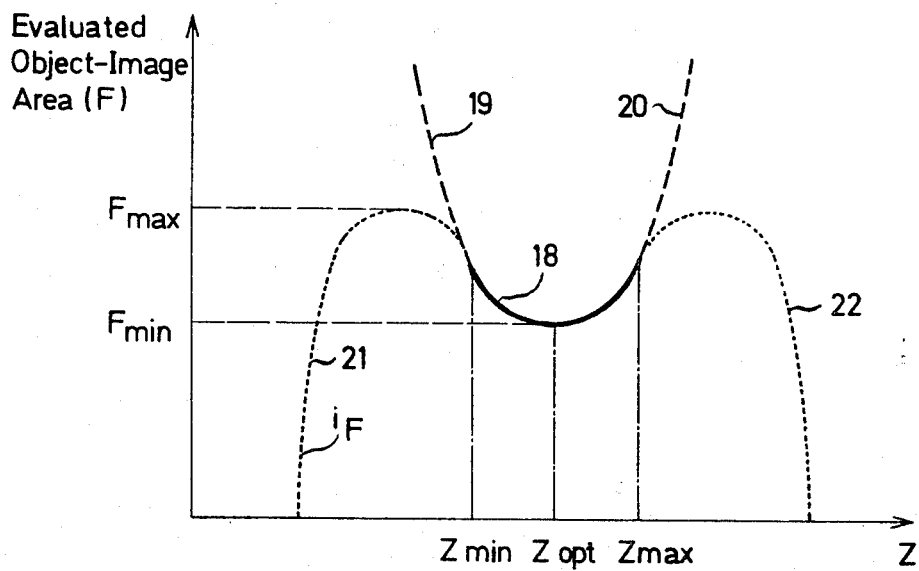
FIG. 4 illustrates graphically the relation between object-image area and vertical ($z$-axis, or focusing) displacement of the microscope stage.

In FIG. 4, the indicated area of the object image is shown in relation to the vertical or axial movement Z of the microscope stage 3. As suggested by the heavyline curved section 18, the object image has a minimum indicated area ($F_{min}$) when the microscope stage 3 is disposed in the critically focused vertical position ($Z_{opt}$). With increased defocusing, the object area in the image increases, as shown by upturned ends of curve 18 and by the two dashed-line curve extensions 19-20 thereof, which apply to visual observation. Similarly, the signal $i_F(Z)$ supplied by the television system 4-8 and proportional to the indicated area of the object image F increases at first with increasing distance from the critically focused distance $Z_{opt}$, following the curve section 18; however, in the presence of stronger defocusing, it passes through a maximum ($F_{max}$) and thereafter decreases more or less steeply, down to zero. This is suggested in FIG. 4 by the two curve legs 21-22, shown in dotted lines.

The realization of the two curve legs 21 and 22 can be explained from an observation of FIGS. 3a and 3b, starting from the optimally focused condition of FIG. 3a. With increased defocusing, the voltage step or pulse 15 (of minimum extent X) is at first enlarged, to a maximum extent, e.g., substantially the extent X' for which the lesser but wider "defocused" pulse 16 is over the threshold 17; thereafter, further defocus so dims the scanned object brightness that the line-scan video voltage begins to fail to achieve the threshold. This phenomenon occurs over the defocused outer regions denoted by dashed-line extensions (19-20) of curve 18, and the increasing failure to cross threshold 17 accounts for rapid descent of the dotted-line curves or legs 21-22. Eventually, a condition is reached that the video signal is completely outside or short of the discriminator threshold 17, which means that the two curve legs 21-22 have reached zero value. The same critical-focus (and accompanying minimum measurement) effect is obtained in the case of a measurement of the dimension Y(Y'), as illustrated in FIGS. 2a and 2b, the only difference being that the observed factor is a minimum count, per raster, for bright-to-dark scan-line traversals of the threshold 14, said count being used by suitable means at station 8 to generate a d.c. voltage of magnitude which is indicative of the count for the most-currently evaluated raster of the TV scan.

Thus, from FIG. 4 it can be seen that it is advantageous in any case to limit the focusing range to the interval of from $Z_{min}$ to $Z_{max}$, as for example, by employment of limit switches, associated with the z-axis displacement mechanism 7. Within this interval, the focal plane (i.e., the plane of critical focus) is distinctly characterized by the minimum of the measuring signal $i_F$ supplied by or derived from the television system.

In FIG. 1, such limit switches are identified at 23-24, respectively set to operate at substantially the $Z_{max}$ and $Z_{min}$ locations discussed in connection with FIG. 4. It will be understood that these switches may be fixedly mounted and respond to a probe, lug or other element 25 carried with z-axis motion of a fine-focused element of the microscope stage 3. FIG. 1 includes schematic showing at 26 of suitable z-axis drive control at station 8, as limited by operation of switches 23-24.

If the device 7 for vertical movement of the microscope stage 3 adjusts the latter at a constant speed, in the case of an area measurement, the time-derivative (obtained by using a differentiating stage) of the d.c. voltage $i_F(t)$, supplied by the measuring and evaluating unit in the control station 8 and proportional to the value F(Z) at zero passage, marks the focal plane. By means of a comparator circuit, as illustrated in FIG. 5, at the zero-axis intercept of the differentiated signal $di_F(t)/dt$, the device 7 may be switched off and the Z-position of the stage held, for observation of the critically focused image.

Figure 5:
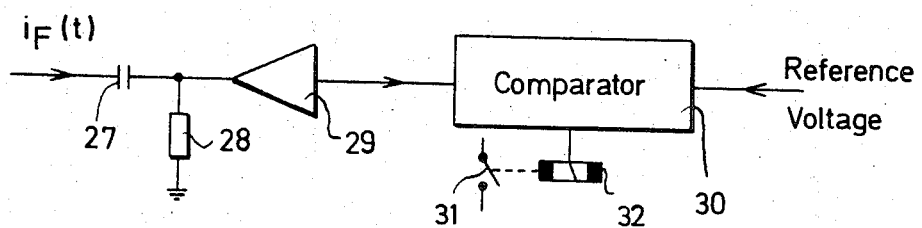
FIG. 5 is an electrical block diagram of a comparator circuit for interrupting the adjustment of fine focusing when the focal plane is reached.

In the circuit according to FIG. 5, the signal $i_F(t)$ is supplied to differentiating means comprising a capacitor 27 and a resistor 28. The differentiated signal is amplified at 29 and then supplied to a comparator, referenced 30; a reference voltage is supplied to the other input of comparator 30. At the zero-axis intercept of the differentiated voltage, contact 31 of a relay 32 is opened in the Z-drive circuit (for device 7), thereby stopping vertical movement of the microscope stage 3.

Sensitivity of automatic focusing according to the invention varies with the size of the illuminating and viewing aperture of the microscope. In the selection of a particular illuminating aperture, however, the attainable contrast of the optical image formation should be taken into consideration.

Figure 6A:
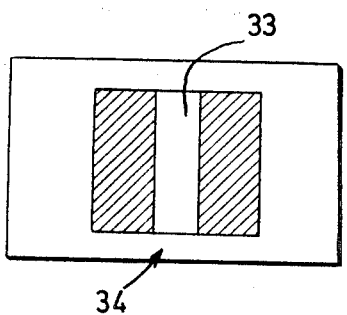
FIG. 6a is a simplified diagram illustrating the image of an object when using a relatively large measuring-field stop.
Figure 6B:
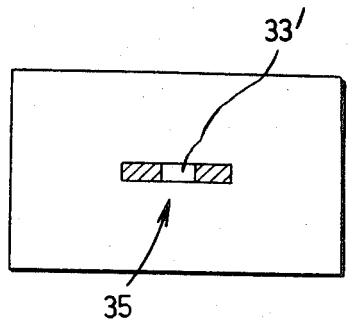
FIG. 6b is a diagram as in FIG. 6a, to illustrate the image of the same object when using a small measuring-field stop.

Also, by selecting the effective measuring-field stop or diaphragm area of the television system, arranged in the path of optical rays, the sensitivity of automatic focusing can be varied within wide limits. An extended object 33, in the case of the measurement of area within a large measuring-field stop area 34, as illustrated in FIG. 6a, only provides relatively small changes in the measurement of area during the focusing operation near the focal plane. But with a measuring-field stop or diaphragm 35 restricted as to its height according to FIG. 6b, the relative change in the indicated object area 33' is substantially greater for a given vertical adjustment of the stage 3. In FIG. 1, suitable placement of such a stop or diaphragm is schematically indicated at 36, although it will be understood that the same way form part of the optical system of either or both of means 2-4.

Functional use of a device in accordance with FIG. 1 will now be described, for the assumed case of an automatic thickness determination of a plurality of microscopic objects.

Upon actuation of a starter key 37 on the control panel 10, and via the control station 8, the microscope stage 3 is first adjusted by motor power in accordance with a pre-selected program for the x- and y-directions, using the coordinate-positioning devices 5 and 6. Once it is displaced into the measuring position, stage 3 remains in a position of rest until termination of the focusing and of the subsequent stereometric measurement, which may, for example, be a thickness measurement, utilizing means not forming a part of this invention. Stage 3 is next vertically positioned by motor power in the z-direction, referenced to a pre-established minimum value $Z_{min}$; it will be understood, alternatively, that it is also possible to attain such focusing by means of a vertical (z-axis) adjustment of the viewing arrangement forming part of the microscope 2, instead of by z-axis movement of the stage 3. Once the stage 3 has been positioned to the preset z-position ($Z_{min}$), the measuring and evaluating electronics in the control station 8 automatically switches to the mode measurement of length or area, for fine focusing in accordance with the invention; at this same time, the motor for the focusing (z-traverse cycle) is switched on, adjusting the stage 3 at constant speed until the object being focused is critically focused, i.e., comes into the focal plane of the viewing optics. When this is the case, (a) the z-motor is switched off (by the circuit of FIG. 5), (b) the measuring and evaluating electronics (in the assumed example) is switched over to thickness measurement, and (c) after termination of this measurement, a new focusing and measuring cycle commences in the described manner with the x-, y-adjustments of the stage 3.

What is claimed is:

1. The method of focusing a microscope having an object-supporting stage transverse to the axis of the microscope objective, and having means for adjusting the relative axial position between the stage and the objective, which method comprises the steps of first roughly making such adjustment while observing a selected portion of the image of the object, then refining the adjustment by scanning the image portion by television means and generating a signal which is proportional to the length or area of the selected image portion, driving the adjusting means through a range of positions commencing on one defocused side of and in the direction toward the roughly determined focus position, such drive being concurrent with the scanning to generate said signal, continuing said drive until said signal reaches minimum value.

2. The method of claim 1, including the step of terminating the drive when said signal reaches minimum value.

3. The method of claim 1, in which only those portions of the video signal of the television-scanning means which exceed a preselected threshold value are used to generate said signal proportional to the length or area of the selected image portion.

4. The method of claim 1, including the step of differentiating with respect to time the signal proportional to the length or area of the selected image portion, said drive continuing until the differentiated signal reaches zero value.

5. The method of claim 1, in which said traverse is made continuously and at substantially constant speed.

6. In combination, a microscope having an object-supporting stage transverse to the axis of the microscope objective and having focusing means for adjusting the relative axial position between the stage and the objective, and a closed-circuit television system including a TV camera positioned to scan the image field of the microscope, means for adjusting the relative transverse position of the stage and objective axis to enable selection of an object to be evaluated in said field, said television system including means periodically scanning said field and developing an electrical signal for a scanned lineal dimension of an object in said field, said focusing means including a fine-focus drive operative to adjust said relative axial position from a defocused relation and in the direction of a focused relation; whereby, in the course of operating said fine-focus drive, said electrical signal reduces in magnitude in approach to the focused relation; and means for terminating said fine-focus drive upon attainment of a minimum amplitude of said electrical signal.

7. The combination of claim 6, in which said last-defined means includes differentiating means connected to respond to said electrical signal, and means responsive to attainment of a zero value in the output of said differentiating means for terminating said fine-focus drive.

8. The combination of claim 6, in which means including a limit switch at said microscope determines a starting position of said fine-focus drive, said limit switch being positioned for a defocused condition at said plane.

9. The combination of claim 8, in which said last-defined means includes a second limit switch at said microscope determining a terminal position of said fine-focus drive, said second limit switch being positioned for a defocused condition at said plane, with critical focus between said positions.

10. The combination of claim 6, and including stop means limiting the object image supplied at said image plane.

* * * * *